PROCESS FOR PRODUCING SOLVENT FOR PAINT AND LACQUER

Filed March 23, 1965

INVENTORS
JUN KUSAMA
TERUHISA FUJIHARA
YUZO CHIHARA 3,475,343
PROCESS FOR PRODUCING SOLVENT FOR PAINT AND LACQUER
Jun Kusama, Tokyo, and Teruhisa Fujihara and Yuzo Chihara, Kanazawa-ku, Yokohama, Japan, assignors to Chisso Corporation, Kita-ku, Osaka, Japan, a corporation of Japan
Filed Mar. 23, 1965, Ser. No. 442,076
Int. Cl. C11d 7/50; C07c 67/02
U.S. Cl. 252—364        6 Claims

ABSTRACT OF THE DISCLOSURE

A process is provided for producing a mixture of aliphatic carboxylic acid esters as a solvent suitable for paint, varnish and lacquer from a mixture of acetaldehyde and a member selected from the group consisting of saturated aliphatic aldehydes having from 3 to 5 carbon atoms and 4 alkoxy substitutes thereof. The process comprises the 1st step of subjecting the said mixture of aldehydes to condensation in the presence of aluminum alcoholate catalyst, the 2nd step of recovering by distillation lower, middle and higher boiling fractions from the resulting ester mixture, and the 3rd step of admixing at least one part of the said higher boiling fraction with at least one part of the said lower boiling fraction and catalyst raw materials comprising Al, lower saturated aliphatic alcohol and $AlCl_3$ to convert and recover the said higher boiling fraction as middle boiling fraction, and simultaneously to produce aluminum alcoholate catalyst subsequently used in the condensation reaction.

---

Figure 1:
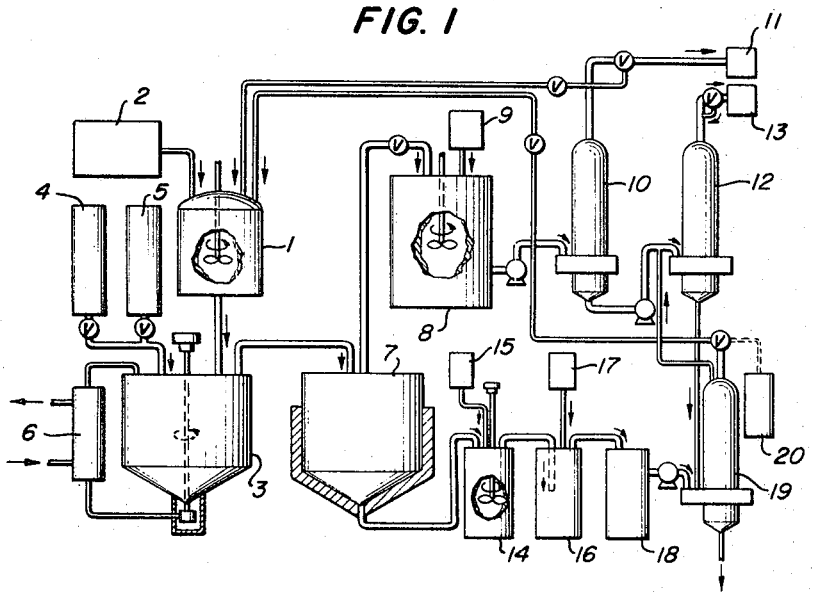

This invention relates to a process for producing solvents consisting of an ester mixture, and useful for paints and lacquers. More particularly it relates to a process for producing a mixture of saturated aliphatic carboxylic acid esters useful for paints and lacquers from a mixture of acetaldehyde and another saturated aliphatic aldehyde having from 3 to 5 carbon atoms and including the case where the aliphatic radical contains a lower alkoxy substituent.

Recently the demand for middle boiling solvents such as butyl acetate, methyl isobutyl ketone, etc., as important ingredients of paints and lacquers, has increased. However, since the cost of such middle boiling solvent is relatively high, it is now desired to develop less expensive middle boiling solvents or a solvent mixture of middle boiling fraction and a desired ratio of low boiling fraction which can be directly used for paints and lacquers.

It is, therefore, an object of the present invention to provide a method for producing less expensive solvents consisting of ester mixtures useful for paints and lacquers.

In such situation, we have found that such solvents can be produced in one step by the application of the so-called Tschenko reaction to a mixture of acetaldehyde and saturated aliphatic aldehyde containing 3 to 5 carbon atoms including the case where the aliphatic radical contains a lower alkoxy substituent. The resulting ester mixtures can be used by themselves as solvent for paints and lacquers in some cases, but when a solvent consisting mainly of middle boiling fraction and a desired ratio of lower boiling fraction is required, and such is the most desirable case of solvents for paints and lacquers, it is necessary to cut off the higher boiling fraction and if necessary also an excess part of lower boiling fraction. Since higher boiling fractions are not attractive, the above-mentioned process has a drawback in the point that it involves a problem of disposal of higher boiling fraction.

It is, therefore, an object of the present invention to provide a method for producing solvents consisting mainly of a middle boiling ester mixture and, if necessary, of a middle boiling ester containing a desired amount of low boiling ester without producing useless amounts of high boiling esters by a remarkably simplified process.

These and other objects will be attained in accordance with the present invention, as will hereinafter appear.

The present invention consists in the 1st step of subjecting a mixture of acetaldehyde and saturated aliphatic aldehydes containing 3 to 5 carbon atoms or lower alkoxy substituted derivatives thereof to condensation in the presence of aluminum alcoholate catalyst, the 2nd step of recovering by distillation lower, middle and higher boiling fractions from the resulting ester mixture, and the 3rd step of mixing at least part of the said lower boiling fraction with the said higher boiling fraction in the presence of catalyst raw materials comprising Al, lower saturated aliphatic alcohol and $AlCl_3$ to convert and recover the said higher boiling fraction as middle boiling fraction and simultaneously to produce the aluminum alcoholate catalyst which is to be used in the subsequent condensation reaction.

In other words, since the catalyst used in the first step of condensation and in the third step of ester exchange reaction can be the same material i.e. aluminum alcoholate and since ester mixtures are useful as a reaction medium or vehicle in the catalyst preparation from aluminum and alcohol, it has been found beneficial to carry out the third step reaction of ester exchange simultaneously with the catalyst preparation in the same apparatus. If the step of catalyst preparation is carried out using lower and higher boiling fractions as a reaction medium and the first to the third steps of the present invention are repeated while feeding aldehyde mixture, withdrawing middle boiling fraction alone or middle boiling fraction containing a desired content of lower boiling fraction, and recycling the higher and a part of the lower boiling fraction to the step of catalyst preparation, it is possible to economize on the apparatus necessary to carry out the ester exchange reaction and reduce the amount of higher boiling fraction to practically zero. The said lower boiling fraction is ethyl acetate, the said middle boiling fraction is a sum of acetates other than ethyl acetate and the ethyl esters of saturated aliphatic carboxylic acids corresponding to aldehydes other than acetaldehyde, and the said higher boiling fraction is an ester other than ethyl acetate having the same number of carbon atoms in the acid constituent as in the alcohol constituent and corresponding to aldehydes other than acetaldehyde.

The preparation of catalyst solution is carried out by a per se known process. As for raw material, alcohol, a lower saturated aliphatic alcohol, preferably anhydrous ethyl alcohol is used. Another raw material, aluminum, is used in the form of small particles, foils or the like. As a catalyst, anhydrous aluminum chloride incorporated with a small amount of water, a slight (catalytic) amount of iodine, mercuric chloride or the like is used. A part of the anhydrous aluminum chloride can be replaced by anhydrous zinc chloride. In carrying out the reaction of catalyst preparation, a solvent such as ethyl acetate is used at first before middle and higher boiling fractions are formed and the resulting catalyst is used in the dissolved form in such a solvent. The proportions of each catalyst constituent are the same as in the known process and illustrated in examples hereinunder described. The temperature of catalyst preparation is from room temperature (e.g. 15 to 30° C.) to boiling temperature of the reacting solution. The reaction is carried out under agitation for from several to 20-odd hours.

The first step condensation reaction is a so-called Tischenko reaction and is carried out at a temperature ranging from about 0° to 20° C. for several to 20-odd hours in the presence of the catalyst solution prepared as above-mentioned.

Aldehydes used as raw materials are a mixture of acetaldehyde and a saturated aliphatic aldehyde containing 3 to 5 carbon atoms, or a lower alkoxy substitute thereof, preferably methoxy and ethoxy substitutes. An aldehyde to be used as a counterpart of acetaldehyde is ont necessarily a single compound, but isomeric mixtures and the like are also useful.

The aldehyde mixture suitable for producing middle boiling solvents for paints and lacquers includes a mixture of acetaldehyde and butyraldehyde, a mixture of acetaldehyde and isobutyraldehyde, a mixture of acetaldehyde, butyraldehyde and isobutyraldehyde, a mixture of acetaldehyde and propionaldehyde, a mixture of acetaldehyde and amylaldehyde, a mixture of acetaldehyde and methoxybutyl aldehyde and the like.

The middle boiling solvents for paints and lacquers produced by the above-mentioned aldehyde mixture in accordance with the present invention include a mixture of n-butyl acetate and ethyl butyrate, a mixture of isobutyl acetate and ethyl isobutyrate, a mixture of n-butyl acetate, isobutyl acetate, ethyl butyrate and ethyl isobutyrate, a mixture of propyl acetate and ethyl propionate, a mixture of amyl acetate and ethyl valerate, a mixture of isoamyl acetate and ethyl isovalerate, a mixture of ethyl methoxybutyrate and methoxybutyl acetate and the like. It is preferable to have esters of aliphatic carboxylic acid having superior solvent power, such as esters of acetic acid, predominant in the ester mixture.

In order to reduce the amount of production of higher boiling fraction, it is preferable to utilize an amount of acetaldehyde in the range of about 30 to 90 mol percent, preferably 40 to 60 mol percent.

After the completion of the condensation, the reaction mixture is subjected to distillation to separate it into three fractions of lower-boiling-, middle-boiling-, and higher-boiling-fraction. It is possible to carry out distillation in one step but is is also possible to carry it out in two steps, e.g. crude distillation and rectification. Further it is also possible to add dilute acid to the crude distillate to decompose the catalyst to render it inactive before the rectification.

The resulting low boiling fraction and higher boiling fraction are, in the next step, subjected to the ester exchange reaction in the presence of the catalyst raw material, aluminum, aluminum chloride, incorporated with a small amount of water, iodine, mercuric chloride and the like to carry out the formation of aluminum alcoholate catalyst simultaneously. The reaction conditions such as temperature, and time are almost the same as those in the catalyst preparation. The mol ratio of higher boiling to lower boiling fraction is preferably approximately relative equimolar relation.

A more detailed explanation will be given as to the above-mentioned case in which the two reactions of catalyst preparation and ester exchange are simultaneously carried out.

In this case the solvent for the catalyst preparation can be replaced by higher-boiling and lower-boiling fractions and accordingly it is not necessary that there be added any solvent except at the start of the operation when higher-boiling and lower-boiling fractions are not yet produced. Further in this case, since the catalyst solution which has once functioned as catalyst for the ester exchange reaction, as soon as it has been formed, still has as good an activity as when it has been freshly formed by the customary method, it can be directly used in the condensation reaction. Accordingly the simultaneous method of catalyst preparation and ester exchange has a notable advantage in the amount of catalyst consumption.

The following reactions are considered to occur in this case, when e.g. ethanol, butyl butyrate and ethyl acetate are used as alcohol, higher boiling fraction and lower boiling fraction, respectively:

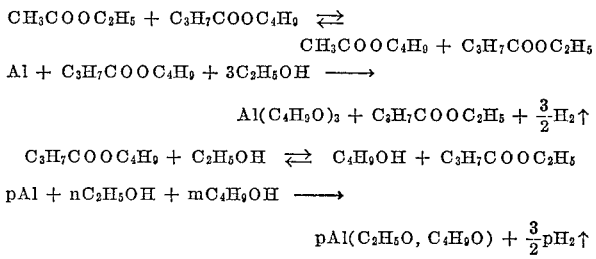

By the above-mentioned reactions, the greater part of higher boiling fraction is converted into middle boiling fraction. Furthermore since the resulting middle boiling fraction performs the role of solvent for the condensation, the reaction mixture is directly used in the condensation reaction.

It is to be understood that where acetaldehyde is condensed with alkanals having the structural formula RCHO wherein R is an alkyl group having from 2 to 4 carbon atoms, the low boiling fraction consists essentially of $CH_3COOC_2H_5$; the middle boiling fraction consists essentially of a mixture of esters having the formulae $$CH_3COOCH_2R$$

and $RCOOC_2H_5$ and the high boiling fraction consists essentially of at least one ester having the structural formula $RCOOCH_2R$.

Thus by the repetition of the above-mentioned operations consisting of the step of simultaneous catalyst preparation and ester exchange, the step of condensation and the step of separation of fractions by distillation, it is possible to effect the production of middle boiling solvents for paints and lacquers exceedingly advantageously.

The ester exchange reaction can also be carried out after the condensation while utilizing the remaining activity of the condensation catalyst. Namely, in this case, after the condensation is subjected to distillation, and after having separated lower boiling and middle boiling fractions, the lower boiling fraction separated is added to the higher-boiling fraction remaining in the still bottom together with catalyst still possessing remaining activity.

In order that those skilled in the art may more fully understand the nature and practice of the present invention, explanation will be given with reference to FIG. 1 and FIG. 2 of the accompanying sheet of drawings.

FIG. 1 is a flow diagram showing the case when all the products of the lower-boiling and higher-boiling fractions are recirculated to a catalyst preparation vessel.

In FIG. 1, 1 is the catalyst preparation vessel. 2 is a raw material tank in which a mixture of raw materials for catalyst preparation is stored. The lower boiling fraction and higher boiling fraction are fed through overhead pipings to the vessel 1 from a low boiler tank 11 and a high boiler tank 20. The catalyst solution formed in the vessel 1 is fed into a condensation vessel 3. 7 is a still for crude distillation. 8 is a tank for a mixture of middle and low boiling fractions distilled from 7. 10 is a rectifying column. From the top of this column 10 is distilled low boiling fraction into the low boiling fraction tank 11, and the bottom is transferred to the column 12 for rectifying middle boiling fraction. The overhead from this column is collected in the middle boiler tank 13 and the bottom is transferred to the column 19 for rectifying high boiler. Almost all the high boiler remains in the still 7 and is transferred to tank 14 where it is treated with dilute sulfuric acid from tank 15 with stirring. It is further treated in tank 16 by soda for the purpose of neutralization under stirring. The treated high boiler is transferred to tank 18 and further to column 19. The distillate from this column is collected in a high boiler tank 20.

Figure 2:
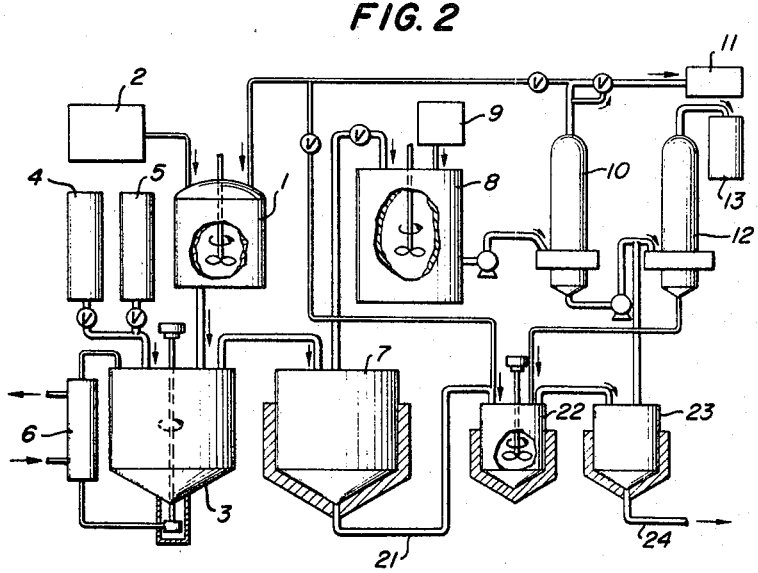

FIG. 2 is a flow diagram showing the case when a part of low boiler is recirculated to the catalyst preparation tank 1 and another part of low boiler is fed to an independent ester exchanger 22. The high boiler from the still 7 is fed through a piping 21. 23 is a still for distilling the ester exchanged product and spent catalyst is withdrawn through a piping 24. Insofar as the parts in FIG. 2 bear the same identifying numerals as in FIG. 1, they are corresponding parts.

Following examples are given to illustrate the present invention but it is to be understood that these examples are merely illustrative and not intended to be limitative of the present invention. The parts used in each examples are all based upon the weight per total weight of mixtures or compositions.

EXAMPLE 1

For the purpose of catalyst preparation 16 parts of anhydrous ethanol, 3 parts of metallic aluminum, 1.5 parts of anhydrous $AlCl_3$, 0.5 part of distilled water, only a small (catalytic) amount of $HgCl_2$ and 20 parts of ethyl acetate, were admixed. This mixture was heated at 75–80° C. to effect the reaction accompanied by the evolution of hydrogen. A catalyst solution was obtained after one overnight reaction.

In the presence of the above-mentioned catalyst solution, a mixture of 100 parts of acetaldehyde and 160 parts of butyraldehyde was subjected to condensation at 0°–15° C., until residual aldehyde disappeared, and the reaction mixture distilled to separate spent catalyst from ester mixture produced.

Composition of liquid produced was as follows:

50 parts of ethyl acetate (20 parts used in the catalyst preparation had been substrated), 40 parts of ethyl butyrate, 85 parts of butyl acetate, 63 parts of butyl butyrate and 5 parts of alcohol (ethyl and butyl).

Both the higher boiling fraction, butyl butyrate, and the lower boiling fraction, ethyl acetate, thus produced were re-used for catalyst preparation.

The catalyst solution (20 hours reaction), in the case where recirculated butyl butyrate and ethyl acetate were used, was as follows:

16 parts of anhydrous ethanol, 3 parts of metallic aluminum, 1.5 parts of anhydrous $AlCl_3$, 0.5 part of distilled water, only a small amount of $HgCl_2$, 80 parts of ethyl acetate and 63 parts of butyl butyrate.

100 parts of acetaldehyde and 160 parts of butyraldehyde were treated in the presence of this catalyst solution. In this case, the composition of the liquid produced was as follows:

106 parts of ethyl acetate, 83 parts of ethyl butyrate, 128 parts of butyl acetate, 73 parts of butyl butyrate and 6 parts of alcohol (ethyl, butyl).

By repeating the above-mentioned process, from a mixture of 160 parts of butyraldehyde and 100 parts of acetaldehyde could be obtained a solvent composed of almost only a middle boiling fraction. The boiling point of this solvent was 120° to 130° C.; the ratio of main ingredient ethyl butyrate to butyl acetate was 1:1.2–1.5.

EXAMPLE 2

In the same way as in Example 1, a mixture of 100 parts of isobutyraldehyde and 100 parts of acetaldehyde was subjected to condensation at 0°–15° C. in the presence of a catalyst prepared by the following method, and then to distillation to separate spent catalyst.

The catalyst solution (15 hours reaction) was as follows:

14.4 parts of ethanol (98%), 2.8 parts of metallic aluminum, 1 part of anhydrous $AlCl_3$, 0.8 part of anhydrous $ZnCl_2$, only a small amount of iodine and 36 parts of ethyl acetate.

The composition of liquid produced (10 hours reaction) was as follows:

90 parts of ethyl acetate (containing 36 parts from catalyst preparation), 14 parts of ethyl isobutyrate, 110 parts of isobutyl acetate, 20 parts of isobutyl isobutyrate and 3 parts of alcohol (ethyl and isobutyl).

100 parts of isobutyraldehyde and 100 parts of acetaldehyde were treated in the presence of a catalyst which was prepared by use of the same raw materials but having added thereto 36 parts of the lower boiling fraction, and 20 parts of the higher boiling fraction, isobutyl isobutyrate, obtained in the previous run.

The catalyst solution (15 hours reaction) in this instance was as follows:

14.4 parts of ethanol (98%), 2.8 parts of metallic aluminum, 1 part of anhydrous $AlCl_3$, 0.8 part of anhydrous $ZnCl_2$, only a small amount of iodine, 36 parts of the lower boiling fraction, ethyl acetate, and 20 parts of the higher boiling fraction, isobutyl isobutyrate.

The composition of the liquid produced after 10 hours reaction in this instance was as follows:

113 parts of the lower boiling fraction, ethyl acetate, 28 parts of ethyl isobutyrate, 125 parts of isobutyl acetate, 22 parts of the higher boiling fraction, isobutyl isobutyrate, and 4 parts of alcohol (composed of ethyl and isobutyl).

As above mentioned, the yield of middle boiling fraction was increased a great deal. By repetition of the above-mentioned process, from a mixture consisting of equal amounts of isobutyraldehyde and acetaldehyde there could be produced, with good yield (95%), products consisting of ethyl acetate and middle boiling fraction alone. The ratio of main composition of isobutyl acetate to ethyl isobutyrate in this middle boiling fraction was 4–6:1.

EXAMPLE 3

A mixture of 100 parts of acetaldehyde and 100 parts of butyraldehyde (containing 20% isobutyraldehyde) prepared by Oxo synthesis from propylene and carbon monoxide, was subjected to condensation in the presence of the following catalyst.

The preparation of catalyst solution (20 hours reaction) was carried out as in Example 1 except that following amounts of raw materials were used:

11 parts of ethanol (98%), 2 parts of metallic aluminum, 1 part of anhydrous $AlCl_3$, 30 parts of ethyl acetate and only a small amount of iodine, i.e. sufficient only to act as catalyst.

The composition of liquid produced by the reaction (containing 2–3% by weight of alcohol) was as follows:

81 parts of lower boiling fraction (ethyl acetate, containing 30 parts from catalyst preparation), 95 parts of middle boiling fraction and 28 parts of higher boiling fraction.

(Note: The above-mentioned middle boiling fraction has a boiling point of 115–130° C., and consists mainly of butylacetate, isobutyl acetate, ethyl butyrate and ethyl isobutyrate. The above-mentioned higher boiling fraction has a boiling point of 145–170° C., and consists mainly of butyl butyrate, isobutyl butyrate, butyl isobutyrate and isobutyl isobutyrate.)

In the same way as in the above examples, in the presence of a catalyst prepared after the addition of the higher and lower boiling fraction, a mixture of 100 parts of butyraldehyde mixture and 100 parts of acetaldehyde was treated.

The preparation of catalyst solution (20 hours reaction) was carried out as in Example 1 except that following amounts of raw materials were used:

11 parts of ethanol, 2 parts of metallic aluminum, 1 part of anhydrous $AlCl_3$, only a small amount of iodine, 30 parts of lower boiling fraction (mainly, ethyl acetate) and 28 parts of higher boiling fraction. The composition of liquid produced (15 hours reaction) was as follows: 67 parts of lower boiling fraction (ethyl acetate, containing 2–3% by weight of alcohol), 131 parts of middle boiling fraction (115–130° C.) and 32 parts of higher boiling fraction (145–170° C.).

EXAMPLE 4

A mixture of 49 parts of propionaldehyde and 73 parts of acetaldehyde was subjected to condensation at 0–15° C. in the presence of the following catalyst and to distillation to separate ester mixture.

The composition of catalyst solution (10 hours reaction) at first was as follows:

11 parts of anhydrous ethanol, 2 parts of metallic aluminum, 2 parts of anhydrous $AlCl_3$, 0.5 part of distilled water and 15 parts of ethyl acetate.

The composition of liquid produced (10 hours reaction) was as follows:

55 parts of lower boiling fraction (ethyl acetate, containing 3% by weight of alcohol) (including 15 parts from catalyst preparation), 42 parts of a mixture of propyl acetate and ethyl propionate (95–105° C.) and 7.5 parts of propyl propionate.

Higher boiling fraction (propyl propionate) and lower boiling fraction (ethyl acetate) were used for catalyst preparation and condensation reaction was carried out thereafter.

The composition of catalyst solution (10 hours reaction) the second time and thereafter was as follows:

11 parts of anhydrous ethanol, 2 parts of metallic aluminum, 2 parts of anhydrous $AlCl_3$, 0.5 part of distilled water, 15 parts of ethyl acetate and 7.5 parts of propyl propionate.

The composition of liquid produced (10 hours reaction) was as follows:

60 parts of lower boiling fraction (ethyl acetate, containing 2–3% by weight of alcohol) (including 15 parts from catalyst preparation), 52.5 parts of a mixture of propyl acetate and ethyl propionate (95–105° C.) and 9 parts of higher boiling fraction (propyl propionate).

EXAMPLE 5

A mixture of 100 parts of isoamyl aldehyde and 100 parts of acetaldehyde was subjected to condensation at 0–10° C. in the presence of the following catalyst and then to distillation to separate ester mixture formed.

The composition of catalyst solution (15 hours reaction) was as follows:

16 parts of anhydrous ethanol, 3 parts of metallic aluminum foil, 3 parts of anhydrous $AlCl_3$, 0.5 part of distilled water, only a small amount of $HgCl_2$ and 30 parts of ethyl acetate.

The composition of liquid produced (7 hours reaction) was as follows:

70 parts of lower boiling fraction (ethyl acetate, containing 1.5% by weight of ethanol) (including 30 parts from catalyst preparation), 20 parts of ethyl isovalerate, 100 parts of isoamyl acetate and 25 parts of higher boiling fraction (isoamyl isovalerate).

In the same way as in the above examples, higher boiling fraction (isoamyl isovalerate) and lower boiling fraction (ethyl acetate) were recirculated into the vessel of catalyst preparation.

The composition of catalyst solution (15 hours reaction) was as follows:

16 parts of anhydrous ethanol, 3 parts of metallic aluminum foil, 3 parts of anhydrous $AlCl_3$, 0.5 part of distilled water, only a small amount of $HgCl_2$, 30 parts of lower boiling fraction (ethyl acetate) and 25 parts of higher boiling fraction (isoamyl isovalerate).

The composition of liquid produced (7 hours condensation) was as follows:

59 parts of lower boiling fraction (ethyl acetate, containing 1.5% by weight of ethanol) (including 30 parts from catalyst preparation), 35 parts of middle boiling fraction (ethyl isovalerate), 114 parts of middle boiling fraction (isoamyl acetate) and 30 parts of higher boiling fraction (isoamyl isovalerate).

EXAMPLE 6

A mixture of 100 parts of methoxy butyraldehyde and 100 parts of acetaldehyde was subjected to condensation at 5–15° C. in the presence of the following catalyst and then to distillation to separate produced liquid.

The composition of catalyst solution (70° C., 4 hours stirring) in the first step was as follows:

25 parts of aluminum ethoxide, 3 parts of anhydrous $AlCl_3$ and 40 parts of ethyl acetate.

The composition of liquid produced (10 hours reaction) was as follows:

118 parts of lower boiling fraction (ethyl acetate), 90 parts of a mixture of ethyl methoxy-butyrate and methoxybutyl acetate (including 95–97% of methoxy-butyl acetate) and 15 parts of higher boiling fraction (methoxybutyl methoxybutyrate).

Higher boiling fraction (methoxy-butyl methoxy-butyrate) and lower boiling fraction (ethyl acetate) were recirculated into the vessel of catalyst preparation.

The composition of catalyst solution (70° C., 6 hours stirring) in the second step was as follows:

25 parts of aluminum ethoxide, 3 parts of anhydrous $AlCl_3$, 40 parts of lower boiling fraction (ethyl acetate) and 15 parts of higher boiling fraction (methoxy-butyl methoxybutyrate).

The composition of liquid produced was as follows:

112 parts of lower boiling fraction (ethyl acetate), 103 parts of a mixture of ethyl methoxy-butyrate and methoxy-butyl acetate (including about 90% of methoxybutyl acetate) and 19 parts of higher boiling fraction (methoxy-butyl methoxy-butyrate).

EXAMPLE 7

A mixture of 80 parts of butyraldehyde and 12 parts of acetaldehyde was subjected to condensation in the presence of the following catalyst and then to distillation to separate produced liquid.

The composition of catalyst solution was as follows:

16 parts of anhydrous ethanol, 3 parts of metallic aluminium powder, 3 parts of anhydrous $AlCl_3$, 0.5 part of distilled water, 20 parts of ethyl acetate and only a small amount of iodine.

The composition of liquid produced was as follows:

105 parts of lower boiling fraction (ethyl acetate, containing 3% of ethanol), 26 parts of ethyl butyrate, 62 parts butyl acetate and 16 parts of higher boiling fraction (butyl butyrate).

In the above-mentioned process, the distillation process was altered as follows. At first, lower and middle boiling fractions such as ethyl acetate, ethyl butyrate and butyl acetate were distilled off and to the residual higher boiling fraction and remaining catalyst was added lower boiling fraction (ethyl acetate) alone, the mixture being heated with stirring at 70° C. for 10 hours and distilled. This distillate was added to the said middle boiling fraction.

The composition of the resulting produced liquid was as follows:

96 parts of ethyl acetate, 37 parts of ethyl butyrate, 74 parts of butyl acetate and 2 parts of butyl butyrate.

What is claimed is:

1. A process for producing a middle boiling mixture of aliphatic carboxylic esters suitable for use as a solvent for paint, varnish and lacquer comprising,
    (1) condensing a mixture consisting essentially of acetaldehyde and at least one aldehyde selected from the group consisting of alkanals having the formula RCHO wherein R is an alkyl group having from 2 to 4 carbon atoms and lower alkoxy substituted derivatives thereof at a temperature of from about 0° C. to about 20° C. in the presence of an aluminum lower-alkanolate catalyst, said mixture containing from about 30 to about 90 mol percent of acetaldehyde;

(2) distilling the resulting ester mixture to substantially separate the low boiling, middle boiling and high boiling fractions thereof, said low boiling fraction consisting essentially of $CH_3COOC_2H_5$ and lower alkoxy derivatives thereof, said middle boiling fraction consisting essentially of a mixture of esters having the formulae $CH_3COOCH_2R$ and $RCOOC_2H_5$ and lower alkoxy substituted derivatives thereof, said high boiling fraction consisting essentially of at least one ester having the formula $RCOOCH_2R$ and lower alkoxy substituted derivatives thereof; and (3) admixing said high boiling fraction, said low boiling fraction, aluminum, lower alkanol and a catalytic amount of a catalyst for the reaction between said lower alkanol and aluminum to produce aluminum lower-alkanolate, said catalyst consisting essentially of aluminum chloride, water and a member selected from the group consisting of mercuric chloride and iodine, the mol ratio of high boiling to low boiling fraction being approximately equimolar and heating said admixture at a temperature of from about 15° to about the boiling point of said admixture to convert said mixture of high boiling and low boiling fractions to a middle boiling fraction while simultaneously producing aluminum alkanolate.

2. The process of claim 1 conducted continuously wherein said mixture produced in step (3) containing middle boiling fraction and aluminum lower alkanolate is recycled to step (1) and a portion of middle boiling fraction is continuously withdrawn from the system while continuously feeding said starting mixture of aldehydes to the system.

3. The process of claim 1 wherein said alkanal is n-butyraldehyde.

4. The process of claim 1 wherein said alkanal is isobutyraldehyde.

5. The process of claim 1 wherein said mixture in step (1) consists essentially of acetaldehyde, n-butyraldehyde and isobutyraldehyde.

6. A process for producing a middle boiling mixture of aliphatic carboxylic esters suitable for use as a solvent for paint, varnish and lacquer comprising, (1) condensing a mixture consisting essentially of acetaldehyde and at least one aldehyde selected from the group consisting of alkanals having the formula RCHO wherein R is an alkyl group having from 2 to 4 carbon atoms and lower alkoxy substituted derivatives thereof at a temperature of from about 0° C. to about 20° C. in the presence of an aluminum lower-alkanolate catalyst, said mixture containing from about 30 to about 90 mol percent of acetaldehyde;

(2) distilling the resulting ester mixture to separate the low boiling, middle boiling and high boiling fractions thereof, said low boiling fraction consisting essentially of $CH_3COOC_2H_5$ and lower alkoxy derivatives thereof, said middle boiling fraction consisting essentially of a mixture of esters having the formulae $CH_3COOCH_2R$ and $RCOOC_2H_5$ and lower alkoxy substituted derivatives thereof, said high boiling fraction consisting essentially of at least one ester having the formula $RCOOCH_2R$ and lower alkoxy derivatives thereof and containing residual aluminum lower alkanolate catalyst; and (3) adding to said high boiling fraction an amount of the low boiling fraction produced during step (2) such that the mol ratio of said high boiling to said low boiling fraction is approximately equimolar and heating the resulting mixture at a temperature of from about 15° C. to about the boiling point of said mixture to convert said high boiling fraction to a middle boiling fraction.

References Cited

UNITED STATES PATENTS 1,785,166   12/1930   Young _____ 260—494

LEON D. ROSDOL, Primary Examiner

STANLEY D. SCHWARTZ, Assistant Examiner

U.S. Cl. X.R.

252—162; 260—494